(12) United States Patent
Scarpantoni et al.

(10) Patent No.: US 11,568,094 B2
(45) Date of Patent: Jan. 31, 2023

(54) ESTABLISHING A TRUSTED CONNECTION WITH A PERIPHERAL DEVICE

(71) Applicant: Microsoft Technology Licensing, LLC, Redmond, WA (US)

(72) Inventors: Alessandro Domenico Scarpantoni, Redmond, WA (US); Shyamal Kaushik Varma, Issaquah, WA (US)

( * ) Notice: Subject to any disclaimer, the term of this patent is extended or adjusted under 35 U.S.C. 154(b) by 273 days.

(21) Appl. No.: 16/595,074

(22) Filed: Oct. 7, 2019

(65) Prior Publication Data

US 2021/0103683 A1 Apr. 8, 2021

(51) Int. Cl.
*G06F 21/82* (2013.01)
*G06F 13/10* (2006.01)
*G06F 13/42* (2006.01)

(52) U.S. Cl.
CPC .......... *G06F 21/82* (2013.01); *G06F 13/102* (2013.01); *G06F 13/4282* (2013.01); *G06F 2213/0042* (2013.01)

(58) Field of Classification Search
CPC .... G06F 21/82; G06F 13/102; G06F 13/4282; G06F 2213/0042
See application file for complete search history.

(56) References Cited

U.S. PATENT DOCUMENTS

| | | | |
|---|---|---|---|
| 8,713,683 B2 | 4/2014 | Moore et al. | |
| 8,904,496 B1 * | 12/2014 | Bailey | G06F 21/552 |
| | | | 709/224 |
| 9,026,712 B2 | 5/2015 | Kwidzinski et al. | |
| 9,582,656 B2 | 2/2017 | Russo et al. | |
| 9,785,771 B1 | 10/2017 | Pratt | |
| 10,169,567 B1 * | 1/2019 | Pentz | G06F 21/44 |
| 10,210,326 B2 | 2/2019 | Soman et al. | |
| 2012/0131353 A1 * | 5/2012 | Nasir | G06F 21/43 |
| | | | 713/189 |
| 2012/0303827 A1 * | 11/2012 | Neystadt | G06F 21/6218 |
| | | | 709/229 |
| 2013/0055044 A1 | 2/2013 | Eljezovic et al. | |
| 2013/0304641 A1 * | 11/2013 | Dabbiere | G06F 13/10 |
| | | | 705/40 |

(Continued)

OTHER PUBLICATIONS

"Device Policies", Retrieved from: https://web.archive.org/web/20180823005152/http:/www.usb-over-network.com/usb-for-remote-desktop-server-help/admin-policies.html, Aug. 23, 2018, 5 Pages.

(Continued)

*Primary Examiner* — Henry Tsai
*Assistant Examiner* — Harry Z Wang
(74) *Attorney, Agent, or Firm* — Ray Quinney & Nebeker; Christopher K. Hallstrom

(57) ABSTRACT

The present disclosure relates to systems, methods, and computer-readable media for establishing and managing a trusted connection between a peripheral device and a client device. For example, systems discussed herein include determining whether a peripheral device poses a security risk based on a combination of peripheral device data and a client profile including environmental data and historical usage data for the client device. Systems described herein may further grant a level of trust based on the determine security risk. The systems disclosed herein facilitate implementation of intelligent policies that are user friendly without exposing the client device to a variety of security threats.

20 Claims, 8 Drawing Sheets

(56) References Cited

U.S. PATENT DOCUMENTS

| | | | |
|---|---|---|---|
| 2016/0182539 A1* | 6/2016 | Edwards | G06F 21/82 |
| | | | 726/23 |
| 2016/0203311 A1* | 7/2016 | Kaines | G06F 21/73 |
| | | | 726/19 |
| 2016/0373408 A1 | 12/2016 | Wentworth et al. | |
| 2017/0351870 A1 | 12/2017 | Knapp et al. | |
| 2018/0239889 A1 | 8/2018 | Burrough | |
| 2018/0293408 A1 | 10/2018 | Young et al. | |
| 2018/0365397 A1* | 12/2018 | Viscarola | G06F 21/45 |
| 2019/0042805 A1* | 2/2019 | Desai | G06F 21/44 |
| 2019/0312883 A1* | 10/2019 | McCarter | G06N 5/025 |

OTHER PUBLICATIONS

Crenshaw, Adrian, "Plug and Prey: Malicious USB Devices", In Proceedings of ShmooCon, Jan. 2011, pp. 1-41.

"International Search Report and the Written Opinion Issued in PCT Application No. PCT/US2020/051347", dated Nov. 17, 2020, 13 Pages.

* cited by examiner

ESTABLISHING A TRUSTED CONNECTION WITH A PERIPHERAL DEVICE

BACKGROUND

Recent years have seen rapid development in communication technology, particularly in the capabilities of electronic devices to connect and communicate with each other over a variety of connections. For example, electronic devices may now communicate with one another using a variety of communication protocols and using a variety of different connectors of different types. Indeed, as electronic devices and communication technology continue to develop, communication capabilities continue to expand to enable a greater number and variety of electronic devices to communicate in a number of different ways. For example, many devices (e.g., peripheral or auxiliary devices) are now capable of performing multiple functions such as communicating different types of data, providing input commands, and/or charging an electronic device.

As various connectors have increased in complexity and become more widely used, a number of security concerns have also become more common. For example, where some older generations of certain devices (e.g., universal serial bus (USB) drives, battery chargers) may have previously been limited to selectively providing data or power to a computing device, more modern devices (e.g., USB-C, USB4) are now able to provide multiple signal types (e.g., command signals, data signals, power signals) to different systems on a computing device. As a result, malicious devices that make use of more current connections may cause considerable damage to individuals and business by hijacking computing devices and/or accessing sensitive information. Moreover, many of these malicious devices are able to cause considerable damage very quickly upon establishing a connection with a computing device. In addition, because many of these malicious devices may appear as a trusted device or common class of device (e.g., keyboard, mouse, trackpad) to a computing device, many computing devices are ill-equipped to prevent security threats caused as a result of malicious devices being connected to one or more physical ports.

These and other problems exist with regard to establishing a trusted connection between electronic devices while utilizing enhanced capabilities of more modern connection devices.

DETAILED DESCRIPTION

Figure 1:
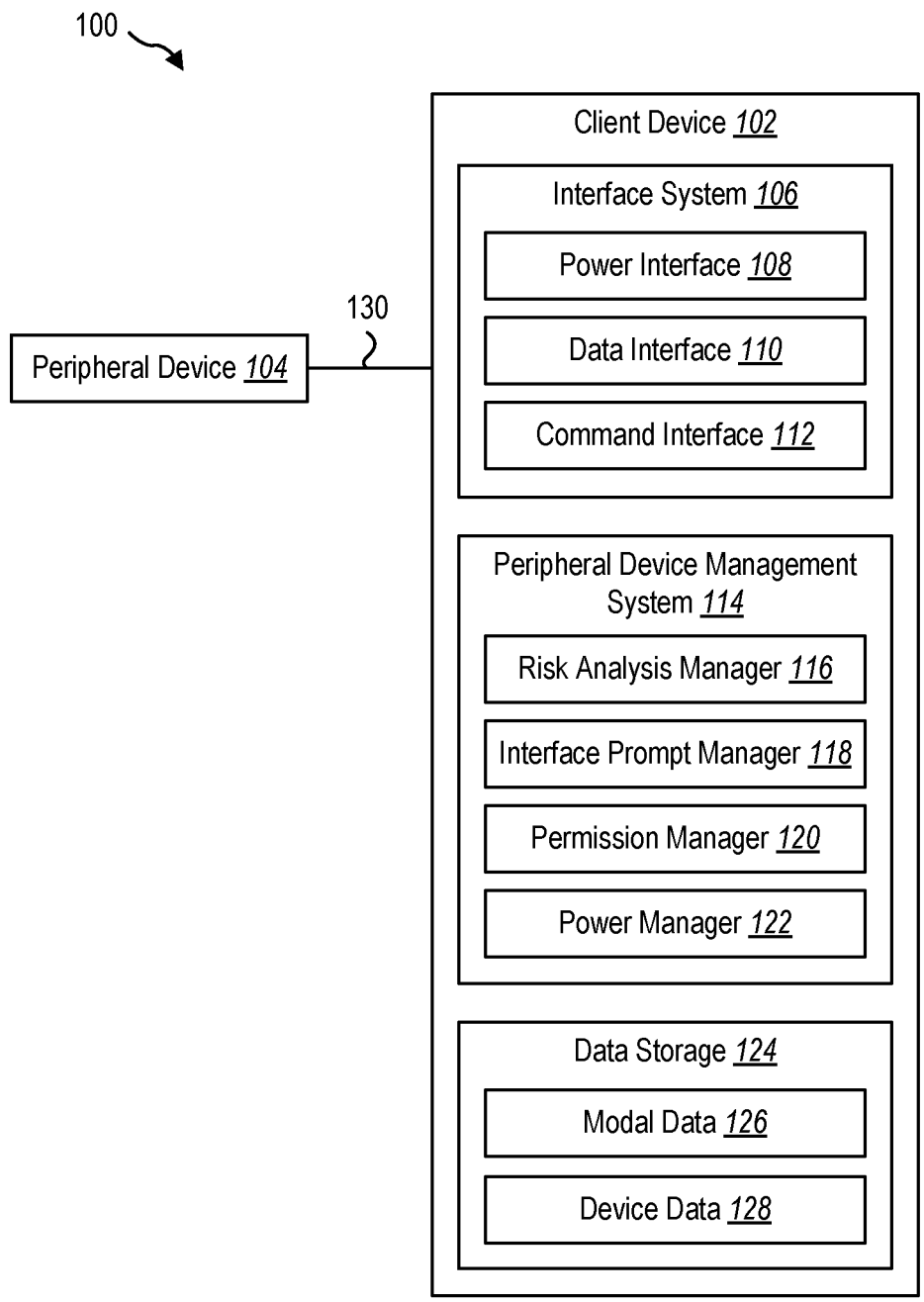
FIG. 1 illustrates an example environment in which a peripheral device management system may manage a connection between a peripheral device and a client device in accordance with one or more embodiments.

The present disclosure relates generally to systems for establishing and managing a trusted connection between a peripheral device and a client device. In particular, as will be discussed in further detail below, a client device may detect a connection with a peripheral device via an external port of the client device and receive peripheral device data including indicator(s) of various features and characteristics of the peripheral device. Upon receiving the peripheral device data, the peripheral device management system can determine a risk factor for the peripheral device associated with a predicted risk or likelihood that the peripheral device is a malicious device capable of attacking one or more systems of the client device. Upon determining the risk factor, the peripheral device management system can grant a certain level of trust to the peripheral device based on the determined risk factor.

In addition to establishing a trusted connection between the peripheral device and the client device, the peripheral device management system can additional manage one or more power settings associated with behavior of the peripheral device in connection with providing one or more signals to the client device. For example, where the peripheral device is capable of charging or otherwise providing power signals for charging the client device at variable charging rates, the peripheral device management system can determine a charging rate based on data associated with the client device (e.g., client profile data) in addition to data received from the peripheral device. Indeed, as will be discussed in further detail below, the peripheral device management system can implement an intelligent power management policy in accordance with one or more embodiments described herein.

As will be discussed in further detail below, the present disclosure includes a number of practical applications having features and functionality described herein that provide benefits and/or solve problems associated with managing a connection between a peripheral device and a client device. For example, as will be discussed in further detail below, the peripheral device management system can implement policies for determining a level of trust to give to a peripheral device that provides flexibility in establishing trusted connections between client devices and a variety of peripheral devices. Indeed, where conventional security policies are generally static and inflexible by either inherently trusting all peripheral devices or, alternatively, requiring manual approval every time a peripheral device is connected to a client device, one or more embodiments described herein implement a more intelligent and user-friendly policy that selectively allows the peripheral device to communicate various signals to the client device without exposing the client device to a variety of security threats.

For instance, by considering environmental factors associated with a client device and/or peripheral device, the peripheral device management system can apply stricter security standards when the client device and peripheral device are connected under unfamiliar circumstances. For example, where a client device detects a connection with a peripheral device at a public location (e.g., an airport, hotel, restaurant), the peripheral device management system may determine that a security risk exists. Moreover, where the client device fails to recognize a familiar wireless network or where the client device cannot detect a presence of a familiar mobile device nearby, the peripheral device management system may similarly determine that a security risk exists. Indeed, as will be discussed in further detail below, the peripheral device management system may consider a number of additional environmental factors in determining a level of risk (e.g., a risk factor) that a peripheral device is a malicious device and likely to attack one or more systems of the client device.

In addition to considering environmental factors associated with the client device, the peripheral device management system may additionally consider historical usage information for the client device in determining a level of risk associated with connecting a peripheral device with the client device. For example, where a client profile includes a history of usage information that indicates an observed pattern associated with connecting one or more specific peripheral devices to an external port of the client device (e.g., at specific times and/or locations), variations of observed patterns may trigger the peripheral device management system to reduce a level of trust and/or provide a user of the client device an interface prompt. The user may further indicate a level of trust that should be provided to the peripheral device which may be used in determining whether to facilitate a trusted connection in response to subsequent instances in which the peripheral device (or similar peripheral devices) are connected to the client device.

In addition to enhancing security of the client device to prevent attacks from malicious peripheral devices, the peripheral device management system can additionally enhance usability of various interfaces provided by the client device by intelligently managing one or more power settings of the client device when connected to a peripheral device. In particular, where a peripheral device is capable of providing a power signal to charge a power source (e.g., a battery) of the client device, the peripheral device management system may analyze similar environmental and historical usage data for the client device as discussed above to determine a rate at which to charge the client device. For instance, where environmental information indicates that the client device is at an airport or public location, the peripheral device management system may determine that a faster charging speed should be used in charging the client device. Alternatively, where environmental and usage history information indicates that a user is at home and about to sleep (thereby leaving the client device idol or logged off for an extended period of time), the peripheral device management system may determine that a slower charging speed should be used to prevent unnecessary wear on the battery.

As illustrated in the foregoing discussion, the present disclosure utilizes a variety of terms to describe features and advantages of the systems described herein. Additional detail is now provided regarding the meaning of some of these terms. For example, as used herein, a "client device" may refer to any type of electronic or computing device having one or more accessible connection ports and capable of connecting to one or more peripheral devices. A client device may refer to a mobile device such as a mobile telephone, a smart phone, a personal digital assistant (PDA), a tablet, a laptop, or wearable computing device. A client device may further refer to one or more non-mobile devices such as a desktop computer, a server (e.g., a cloud server), or other non-portable device. Additional detail in connection with an example computing device is discussed below in connection with FIG. 7.

As used herein, a "connection port" or "port" refers to a connection interface of a client device including hardware that is shaped and configured to receive a corresponding connector device capable of establishing a connection and facilitating communication between the client device and an additional device (e.g., another computing device and/or a peripheral device). For example, a connection port may include an externally accessible port positioned on a housing of a device that provides a connection point for connecting a peripheral device with the client device. A connection port may further include interface hardware including one or more buses (e.g., power bus, data bus, peripheral component interconnect (PCI) bus) that provide signals to and from various components of the client device. Examples of connection ports may include USB ports (e.g., USB-C port(s), USB4 port(s)), display ports, power ports, or any other standards of connection ports capable of receiving a connector of a similar or otherwise compatible standard.

As used herein, a "peripheral device" may refer to any electronic device that serves as an auxiliary device to a client device and is capable of connecting to the client device via a connection port. For example, a peripheral device may refer to any electrical device that provides data, power, input commands, and/or receives data from a client device. Examples of peripheral devices include a mouse, a keyboard, a touchpad, a digital pen, a portable storage device (e.g., a USB flash drive), a printer, or a variety of Internet of things (IoT) devices. Indeed, a peripheral device may refer to any electronic device having an associated connector (e.g., a connection device) capable of plugging into a connection port and enabling communication of one or more signals between the peripheral device and the client device. Examples of connectors include USB connectors, HDMI connectors, lightning connectors, or any other standard of connector (and/or associated connection adapters) capable of plugging into a compatible connection port.

As will be discussed in further detail herein, a client device may receive peripheral device data including any information associated with features and/or characteristics of a peripheral device. In addition, a client device (e.g., a peripheral device management system) may determine a level of trust to grant a peripheral device based on a combination of peripheral device data and device profile data including any information associated with a client device. Device profile data may include historical usage data, environmental information, or any other information tracked or otherwise maintained by the client device that may be used in determining a risk factor for a client device and peripheral device pair. Further information in connection with peripheral device data and device profile data will be discussed in connection with one or more embodiments described herein.

Additional detail will now be provided regarding systems disclosed herein for establishing and managing a trusted relationship between a peripheral device and a client device. For example, FIG. 1 illustrates an example environment 100 including a client device 102 connected to a peripheral device 104. The client device 102 may refer to a variety of computing devices such as a mobile device, non-mobile device, or any computing device having one or more externally accessible connection ports. Similarly, the peripheral device 104 may refer to a variety of peripheral device types including electronic devices capable of providing input commands, devices capable of storing digital content and/or providing access to stored digital content, and/or devices capable of providing power to one or more components of the client device 102. In one or more embodiments, the peripheral device 104 is a malicious device capable of attacking a system or misusing access to information on a system in a number of ways.

As shown in FIG. 1, the client device 102 and peripheral device 104 are connected via a connector 130. The connector 130 may include a wired connection device such as a USB connector (e.g., a USB-C or USB4 connector) that plugs into an externally accessible connection port of the client device 102. The connector 130 may refer to a variety of connectors having different communication capabilities. For instance, in one or more embodiments, the connector 130 includes a USB-C or USB4 connector capable of transmitting power signals, data signals, and input commands. In one or more implementations, the connector 130 may refer to any connector device that enables the peripheral device 104 to interface with one or more bus drivers or interface hardware to communicate various signals to components of the client device 102.

As shown in FIG. 1, the client device 102 includes an interface system 106. The interface system 106 may have a variety of system interfaces including, by way of example, a power interface 108, a data interface 110, and a command interface 112. Each of the interfaces 108-112 may include associated hardware (e.g., bus systems and drivers) capable of receiving and providing different types of signals to various components of the client device 102. For instance, each of the interfaces 108-112 may include bus drivers, USB hubs, or any hardware component that provides an interface to different components of the client device 102.

For example, a power interface 108 may include a power bus or bus driver that provides a supply of power (e.g., voltage and/or current) to components of the client device 102. Similarly, the data interface 110 may include a data bus or bus driver that communicates data to and from the peripheral device. Moreover, the command interface 112 may include a communication bus or bus driver capable of communicating commands or other data from the peripheral device to the client device 102. In one or more embodiments, the command interface 112 includes a peripheral component interconnect (PCI) capable of interacting with memory of the client device 102 and providing input commands.

Each of the interfaces 108-112 shown in FIG. 1 (as well as other types of interfaces) may include separate or discrete hardware components for providing an interface for respective components and systems of the client device 102. In addition, each of the interfaces 108-112 may include software components to facilitate interaction of various signals between the client device 102 and peripheral device 104. Alternatively, while FIG. 1 illustrates an example in which the interfaces 108-112 refer to individual and distinct components, one or more of the interfaces 108-112 may be integrated or combined as part of the same hardware and/or software to communicate respective types of signals between the peripheral device 104 and the client device 102.

As further shown in FIG. 1, the client device 102 includes a peripheral device management system 114. As mentioned above, the peripheral device management system 114 may determine whether the peripheral device 104 should be trusted based on a variety of factors. Moreover, the peripheral device management system 114 may determine a level of trust to grant the peripheral device 104 upon determining that the peripheral device 104 does not pose a significant security threat.

As shown in FIG. 1, the peripheral device management system 114 includes a risk analysis manager 116, an interface prompt manager 118, a permissions manager 120, and a power manager 122. As will be discussed in further detail below, the components 116-122 of the peripheral device management system 114 may cooperatively collect peripheral device data, identify relevant device profile data, and determine whether to trust the peripheral device 104 based on the peripheral device data and device profile data. Further detail in connection with establishing a trusted connection and managing a connection is discussed in further detail below in connection with FIG. 2.

As further shown in FIG. 1, the client device 102 includes a data storage 124, which may include model data 126 and device data 128. The model data 126 may include any information associated with an algorithm or model for analyzing a risk that establishing a trusted connection with the peripheral device 104 poses to the client device 102. In one or more embodiments, the model data 126 includes a machine learning model or other deep learning model trained to determine or otherwise predict a level of risk associated with a peripheral device 104.

The device data 128 may include any information associated with the client device 102. For example, the device data 128 may include a device profile, which may include a usage history for the client device 102. Usage history data may include an identification of any peripheral devices that have previously connected to the client device 102. Usage history data may further include a record of connections between the peripheral device 104 (or similar types of peripheral devices having same set of indicators) and the client device 102. Usage history data may additionally include a pattern of use for the client device 102 such as typical times that the client device 102 is turned on and in-use, a history of locations of the client device, and/or a record of times and locations when various peripheral devices have been connected to the client device 102.

In addition to usage history data, the device data 128 may include environmental data associated with an environment or current state of the client device 102. Environmental data may include, by way of example, a current location of the client device 102 (e.g., at a time when a connection with a peripheral device is detected), such as a public location, a private location, or an unknown location. Environmental data may further include network information such as information about a wireless network that the client device 102 is connected to and/or any existing (or lack of) Bluetooth or short-range wireless connections with various devices (e.g., a user's mobile phone). Environmental data may additionally include information about any peripheral devices to which the client device 102 is already connected when a connection with the peripheral device 104 is detected. This may include an indication of any internal peripheral devices (e.g., on-device keyboard, on-device trackpad) connected via internal connection hardware as well as any peripheral devices connected via one or more externally accessible connection ports.

The components 106-122 of the systems of the client device 102 may include software, hardware, or both. For example, the components of the interface system 106 and/or peripheral device management system 114 may include one or more instructions stored on a computer-readable storage medium and be executable by processors of one or more computing devices. When executed by the one or more processors, the computer-executable instructions of the systems 106, 114 can cause the client device 102 to perform the methods described herein. Alternatively, the components of the systems 106, 114 can comprise hardware, such as a special-purpose processing device to perform a certain function or group of functions. Additionally, or alternatively, the components of the systems 106, 114 can include a combination of computer-executable instructions and hardware.

Additional detail about establishing a trusted connection with the peripheral device 104 and managing the connection will now be discussed in connection with FIG. 2. In particular, FIG. 2 illustrates an example workflow 200 illustrating an example interaction of components of the peripheral device management system 114 in accordance with one or more embodiments.

Figure 2:
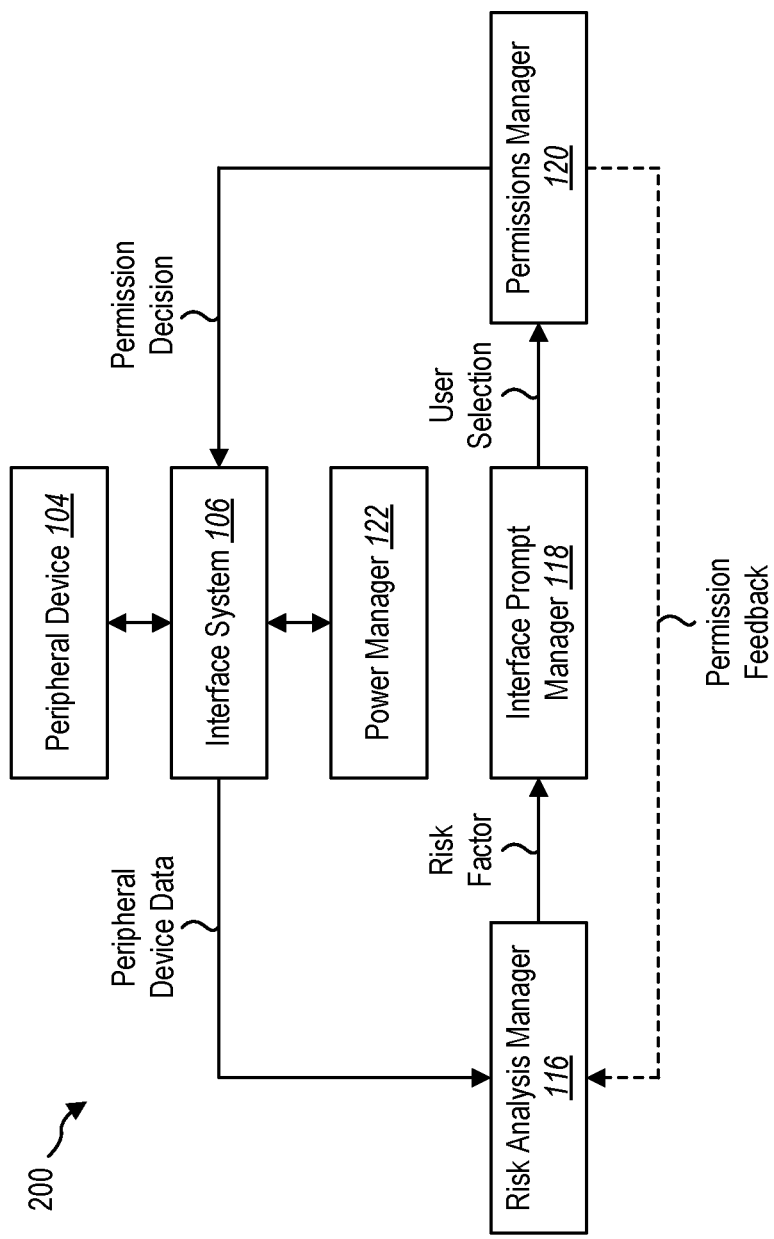
FIG. 2 illustrates an example workflow for establishing a secure connection between a peripheral device and a client device in accordance with one or more embodiments.

As shown in FIG. 2, the peripheral device 104 may connect to the client device 102 via the interface system 106. As discussed above, the interface system 106 may include different interfaces capable of receiving different signals from the peripheral device 104. In one or more embodiments, upon detecting a connection with the peripheral device 104, the interface system 106 may provide a request for peripheral device data associated with features of the peripheral device. As mentioned above, peripheral device data may include any data associated with the peripheral device 104. The peripheral device data may refer to device descriptors (e.g., peripheral device indicators) including, by way of example, an identified class of the peripheral device 104, information about a manufacturer or model of the peripheral device 104, and a hardware identifier. In one or more embodiments, the peripheral device data may include a device-type indicator indicating a type of peripheral device (e.g., keyboard, touchpad, mouse, storage device).

As used herein, a device-type may refer to a device having a corresponding set of capabilities (e.g., input, storage, media). A device-type may further refer to a specific brand of device. In one or more implementations, a device-type refers to a device having a corresponding set of features or characteristics (e.g., a specific set of inputs). For example, a first device-type may refer to a keyboard or other similar type of input device (e.g., the same or different keyboard) while a second device-type may refer to a mouse, a USB storage device, or other different type of input device. As another example, a first device-type may refer to a keyboard having a first set of inputs while a second device-type refers to a keyboard having a second set of inputs (e.g., a keyboard from a different manufacturer).

Upon receiving the peripheral device data, the interface system 106 may provide the peripheral device data to a risk analysis manager 116. The risk analysis manager 116 may additionally obtain a device profile including information associated with the client device 102. In particular, as mentioned above, the risk analysis manager 116 may collect device profile data including a combination of environmental data (e.g., a current state of the device's environment) and historical usage data for the client device 102. In one or more embodiments described herein, the client device 102 may collect the device profile data from a local storage of the client device 102.

The risk analysis manager 116 may analyze the peripheral device data and the device profile data to determine a predicted risk of establishing a trusted connection with the peripheral device 104. In particular, the risk analysis manager 116 can analyze indicators or other signals associated with features of the peripheral device 104 in conjunction with signals or factors from the device profile data to determine a risk factor associated with a risk that the peripheral device 104 is a malicious device likely to attack one or more systems of the client device 102. In one or more embodiments, the risk analysis manager 116 applies an algorithm or model trained to compare a risk factor (e.g., a risk metric or other value) with a threshold risk factor to determine whether the risk factor exceeds the threshold risk factor.

In one or more embodiments, the risk analysis manager 116 applies a risk analysis model that includes a machine learning model or other deep learning model trained to evaluate any number of inputs corresponding to indicators of the peripheral device and/or data signals from the client profile. For example, in one or more embodiments, the risk analysis manager 116 trains or receives a machine learning model (e.g., a decision tree model, neural network, or other deep learning model) trained to associate any combination of inputs from the peripheral device data and the device profile data to determine an associated probability or likelihood that a peripheral device is a malicious device based on a given set of indicators for the peripheral device and a given set of device profile factors.

As mentioned above, the risk analysis manager 116 may analyze any number of factors to determine an associated risk factor. As a first example, the risk analysis manager 116 may consider a device-type or class of the peripheral device when determining an associated risk factor. For instance, where a peripheral device 104 includes device descriptors that identify the peripheral device 104 as a keyboard, mouse, or other electronic device capable of providing input commands, the risk analysis manager 116 may associate these devices with a high level of risk. Accordingly, where the peripheral device 104 is capable of interacting directly with a PCI bus, or is otherwise capable of executing a wide range of commands, the risk analysis manager 116 may determine a higher level of risk than other peripheral devices that are not capable of interacting via the PCI bus or that may have a limited range of inputs or features.

Nevertheless, even where a peripheral device 104 is a device-type associated with a high level of risk, the risk analysis manager 116 may nonetheless determine that the risk factor is less than a threshold risk factor based on additional factors. For example, where a usage history (e.g., from a device profile) indicates that the client device 102 commonly interacts with the peripheral device 104 (or with a device having similar or identical device indicators), the risk analysis manager 116 may determine that the peripheral device 104 being able to interact with the PCI bus does not pose as high of a threat as when the usage history indicates that a detected connection of the peripheral device 104 with the client device 102 is a first time that the client device 102 has connected with a similar type of peripheral device.

As another example, the risk analysis manager 116 may consider a current set of circumstances (e.g., environmental factors) of the client device 102 to further determine a risk factor. For instance, even where the client device 102 may have a history of connecting with similar types of peripheral devices, the risk analysis manager 116 may determine that a current location of the client device 102 (e.g., a location of the client device 102 at a time that the peripheral device 104 is detected) is associated with a higher risk factor. For instance, where a client device 102 is at an airport, restaurant, or other public location, the risk analysis manager 116 may determine that connecting a keyboard-type of device is generally uncommon (or at least uncommon for the specific client device 102) and therefore a potential security threat. Alternatively, where the client device 102 has a usage history that indicates that it is common for a user of the client device 102 to use a mouse-type peripheral device, even while at a particular public location, the risk analysis manager 116 may indicate a lower risk while at the public location than were the risk analysis manager 116 to detect use of a keyboard-like device.

In addition to a location of the client device 102, the risk analysis manager 116 may further consider environmental factors including information associated with local network(s) and/or proximate objects. For example, where the client device 102 refers to a laptop, desktop, or other computing device other than a smartphone (or other mobile device) that is commonly on a user's person, the risk analysis manager 116 may detect an absence of the smartphone within a proximity of the client device 102. For instance, the risk analysis manager 116 may detect that a smartphone is not connected to the same wireless network as the client device 102 (e.g., where they are usually connected to the same network) or that the client device 102 does not have an active Bluetooth (or other short-range wireless network) connection with the smartphone (e.g., where they are generally connected when in the same proximity). Based on this determination, the risk analysis manager 116 may determine a higher risk factor based on a prediction that a user of the client device 102 is not the typical user.

As an additional example, the risk analysis manager 116 may consider one or more additional peripheral devices that are currently connected to the client device 102. For example, where the client device 102 is already connected to a trusted keyboard device (or where the client device 102 includes a built-in keyboard that is commonly used by a user of the client device 102), the risk analysis manager 116 may determine a higher risk factor upon detecting another keyboard-type peripheral device being connected to a connection port than a mouse-type or different type of peripheral device.

Each of the above use-cases are provided by way of example and are not intended to be limiting to the specific combination of factors discussed therein. For example, any of the factors discussed in connection with the specific examples may be combined with one or more additional examples discussed herein. Indeed, any combination of factors discussed herein may be considered in determining a risk factor for a peripheral device 104. For example, the risk analysis manager 116 may consider any combination of features of a peripheral device 104 (e.g., peripheral device indicators) in combination with any combination of environmental factors and historical usage factors in determining an associated risk factor for a client device 102 and connected peripheral device 104.

In one or more embodiments, the risk analysis manager 116 may consider one or more single factors as high-risk factors that individually cause a risk factor to exceed a threshold. For example, the risk analysis manager 116 may automatically determine a high-risk factor (e.g., higher than a threshold metric) whenever a peripheral device capable of interacting with a PCI bus is detected for the first time with the client device 102. Nevertheless, the risk analysis manager 116 may consider any combination of multiple factors discussed herein including a combination of peripheral device indicators and client profile information including both environmental information and usage data associated with the client device 102. In this way, the risk analysis manager 116 can implement an individualized policy to determine whether the peripheral device 104 poses a security risk when connected to the client device 102.

As shown in FIG. 2, the risk analysis manager 116 may provide the risk factor and/or indication of whether the risk factor exceeds a threshold risk factor to an interface prompt manager 118. Based on the risk factor, the interface prompt manager 118 can generate and provide an interface prompt to indicate to a user of the client device 102 that the peripheral device 104 poses a security risk to the client device 102. For instance, the interface prompt manager 118 may provide an interface that includes a display of a reason for the prompt and/or a certainty that the peripheral device 104 is a malicious device capable of attacking systems of the client device 102.

In one or more embodiments, the interface prompt manager 118 includes one or more selectable options that enable a user of the client device 102 to provide an input regarding whether to allow or block access to the peripheral device 104 to one or more interfaces of the interface system 106. For instance, the interface prompt manager 118 may provide a prompt indicating a risk associated with the peripheral device 104 and options to enable the user to establish a trusted connection with the peripheral device 104 or, alternatively, to block any further communication between the client device 102 and the peripheral device 104. In one or more embodiments, the interface prompt manager 118 may provide additional options associated with granting variable levels of access. For example, the interface prompt manager 118 may provide selectable options to enable access to a power bus or data bus while preventing access to a PCI bus.

As shown in FIG. 2, the interface prompt manager 118 can provide a detected user selection to a permissions manager 120. The permissions manager 120 may provide or otherwise grant a level of trust to the peripheral device 104 based on the selected option from the interface prompt. In one or more embodiments, the permissions manager 120 provides unrestricted access to the peripheral device 104. Alternatively, in one or more embodiments, the permissions manager 120 completely blocks access to the peripheral device 104. In one or more implementations, the permissions manager 120 provides partial access, such as enabling interaction with a power bus without providing access to a PCI bus.

As shown in FIG. 2, the permissions manager 120 may provide a permission decision to the interface system 106 to grant or prevent access to systems of the client device 102 in accordance with the permission decision. For example, where the permission decision includes instructions to establish a trusted connection with the peripheral device 104, the interface system 106 may provide or otherwise generate an enumeration for the peripheral device 104. For instance, the interface system 106 may enumerate the peripheral device by creating a software extraction and initializing any routines or drives to enable the peripheral device 104 to interact with the client device 102 according to a level of trust granted by the peripheral device management system 114. The interface system 106 may create a mapping of inputs unique or particular to the peripheral device 104 such that the client device 102 understands how to interpret inputs or other signals received from the peripheral device 104 and to otherwise enable the peripheral device 104 to function in a way that the peripheral device 104 is intended to function.

As further shown in FIG. 2, in addition to providing the permission decision to the interface system 106, the permissions manager 120 may provide permission feedback to the risk analysis manager 116 to further refine an algorithm or model for determining risk factors for future detected connections of the peripheral device 104 or other peripheral devices. In this way, the peripheral device management system 114 may iteratively refine models used to determine a risk factor based on a history of received user selections and improve upon the accuracy of determining risk factors for the client device 102 over time.

Also shown in FIG. 2 is a power manager 122 in communication with the interface system 106. In one or more embodiments, the interface system 106 may consider similar factors as the risk analysis manager 116 to determine one or more power settings associated with charging a client device 102. For instance, where a peripheral device 104 includes charging capabilities, the interface system 106 may consider historical usage information and environmental factors of the client device 102 to determine one or more power settings to apply between the peripheral device 104 and client device 102.

As an example, where a client device 102 is located at an airport or other public place at a time when a peripheral device capable of charging the client device 102 is detected, the power manager 122 may determine to charge the client device 102 at a faster rate than a typical default rate for the client device 102. Alternatively, where a client device 102 is located at a residence at night or other time when the client device 102 is not expected to be used for an extended period of time, the power manager 122 may determine to charge the client device 102 at a slower rate than a typical default rate (e.g., to preserve battery longevity or other power consideration). The power manager 122 may also consider any of the above factors to determine whether to charge a battery to full capacity (e.g., 100% capacity) or some other measure of capacity in accordance with or in contrast to a default power setting.

Figure 3:
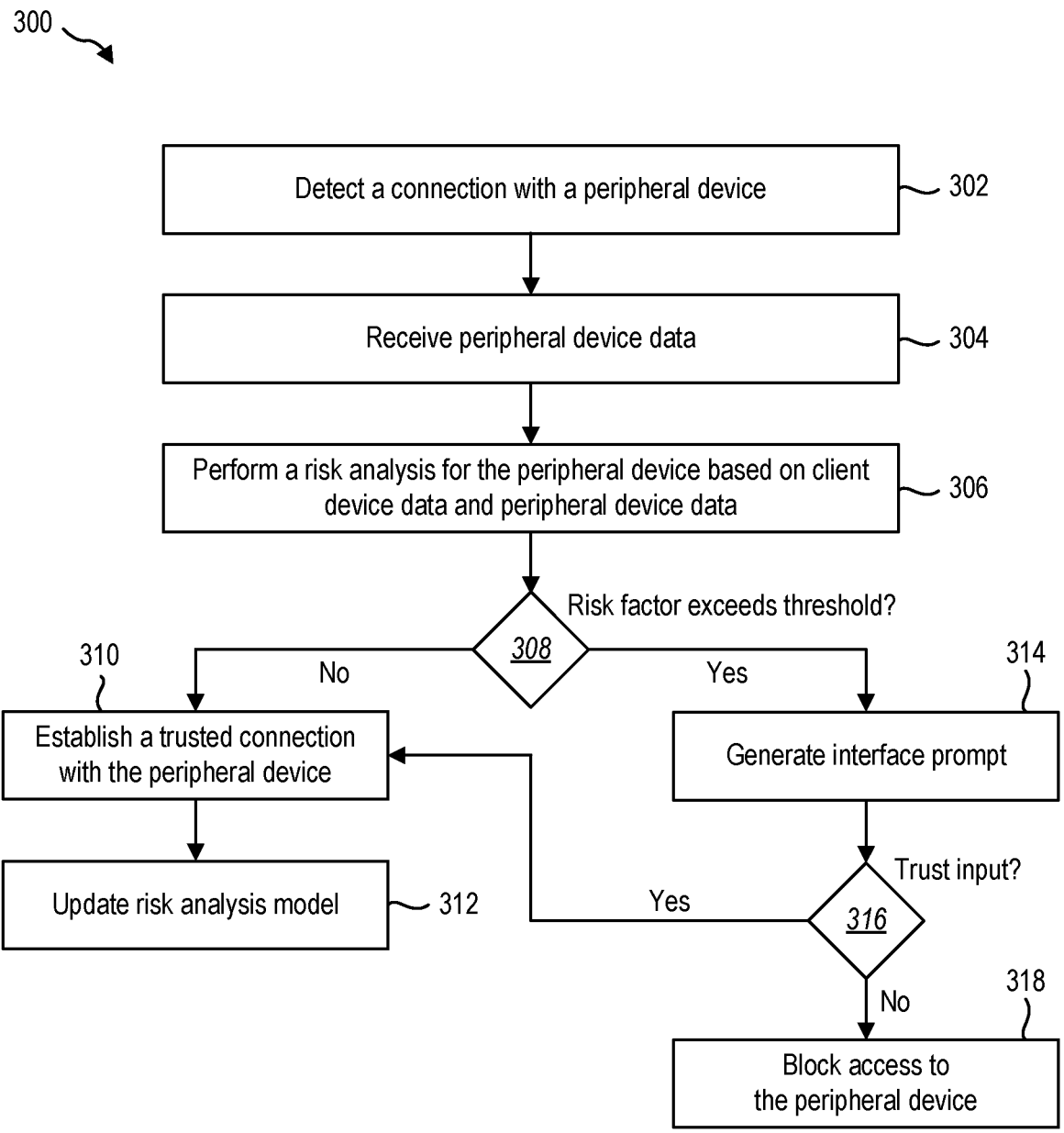
FIG. 3 illustrates a series of acts for establishing a secure connection with a peripheral device in accordance with one or more embodiments.
Figure 4:
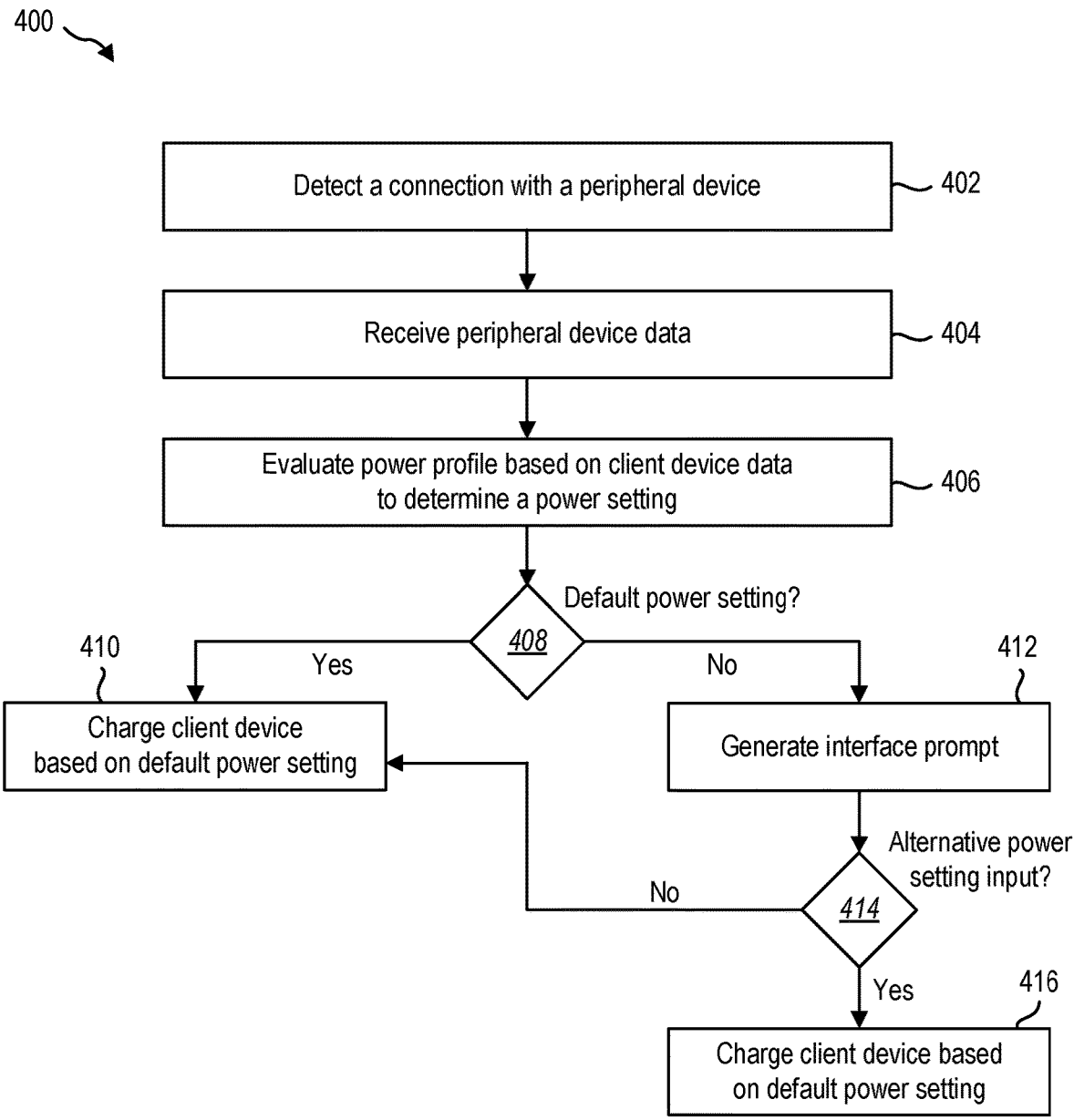
FIG. 4 illustrates a series of acts for intelligently managing delivery of power to a client device from a peripheral device.

While FIG. 2 illustrates an example workflow 200 including interactions and data that may be shared between components of the client device 102, FIGS. 3-4 illustrate example series of acts that may be performed in establishing a secure connection with a peripheral device as well as managing one or more power settings in accordance with one or more embodiments described herein. For instance, FIG. 3 illustrates a first example series of acts 300 for establishing a connection with a peripheral device in accordance with a determined risk factor.

As shown in FIG. 3, the client device 102 may perform an act 302 of detecting a connection with a peripheral device 104. In one or more embodiments, the interface system 106 detects the connection with the peripheral device 104 based on a detected voltage drop or spike as a result of a connector of the peripheral device 104 coming into contact with an externally accessible port of the client device 102.

In response to detecting the connection with the peripheral device, the client device 102 may perform an act 304 of receiving peripheral device data from the peripheral device 104. For example, the interface system 106 may request information from the peripheral device to enable the interface system 106 to identify a class or type of peripheral device 104, a manufacturer or device identifier associated with the peripheral device 104 and any other information requested by the interface system 106 upon detecting a connection of the peripheral device 104.

As further shown, the client device 102 may perform an act 306 of performing a risk analysis for the peripheral device 104 based on client device data (e.g., client profile data) and the received peripheral device data. For example, the peripheral device management system 114 may analyze any number of factors including a combination of peripheral device indicators, environmental factors, and historical usage data of the client device 102 to determine a risk factor indicative of a risk or likelihood that the peripheral device 104 is a malicious device that is both capable and likely to attack one or more systems of the client device 102.

As shown in FIG. 2, the client device 102 may perform an act 308 of determining whether the risk factor exceeds a threshold. For example, the peripheral device management system 114 may determine whether a likelihood that the peripheral device 104 is a malicious device is greater than a threshold likelihood. Where the risk factor does not exceed a threshold (e.g., where the likelihood of a malicious attack is very low), the peripheral device management system 114 may forgo providing any interface prompt and perform an act 310 of establishing a trusted connected with the peripheral device 104. For example, the peripheral device management system 114 may provide instructions to allow the interface system 106 to provide access to one or more bus interfaces (e.g., a PCI interface) based on a trusted status for the peripheral device 104.

In addition to establishing the trusted connection, the peripheral device management system 114 may additionally perform an act 312 of updating a risk analysis model. For example, the peripheral device management system 114 may fine-tune or further train a risk analysis model used at act 306 to perform the risk analysis and determine a risk factor for the peripheral device 104.

Referring again to act 308, where the client device 102 determines that the risk factor exceeds a threshold, the client device 102 may perform an act 314 of generating an interface prompt. For example, the peripheral device management system 114 can generate an interface prompt including information about the potential security threat as well as provide a number of selectable options that enable a user to manually indicate whether to trust or not trust the peripheral device 104. Additional detail in connection with example interface prompts are discussed below in connection with FIGS. 5A-5B.

Where the peripheral device management system 114 detects 316 an input to trust the peripheral device 104, the peripheral device management system 114 may perform the act 310 of establishing the trusted connection. The peripheral device management system 114 may further perform the act 312 of updating the risk analysis model to further reflect the user input indicating that the peripheral device 104 associated with the corresponding client profile data might be trusted in future instances (e.g., depending on the particular risk analysis model). Alternatively, where the peripheral device management system 114 does not detect 316 an input to trust the peripheral device 104 (or where the user specifically selects an input to not trust the peripheral device 104), the peripheral device management system 114 may instead perform an act 318 of blocking access to the peripheral device 104. For example, the peripheral device management system 114 may selectively block access to a PCI bus or other interface of the interface system 106.

FIG. 4 illustrates another example series of acts 400 associated with establishing a connection with a peripheral device 104 and managing one or more power settings based on a combination of the peripheral device information and client profile data. For example, similar to FIG. 3, the client device 102 may perform an act 402 of detecting a connection with a peripheral device 104. The client device 102 may additionally perform an act 404 of receiving peripheral device data. The acts 402-404 may include similar features as discussed above in connection with corresponding acts 302-304. Moreover, while not shown in FIG. 4, the client device may proceed to establish a trusted connection with the peripheral device in accordance with one or more embodiments described herein prior to proceeding onto act 406.

As shown in FIG. 4, the peripheral device management system 114 may perform an act 406 of evaluating a power profile based on client device data (e.g., a client profile) to determine a power setting. For example, as discussed above, the peripheral device management system 114 may analyze various environmental factors and usage history factors to determine a specific power setting to apply when charging the client device 102 using the peripheral device 104.

As shown in FIG. 4, the peripheral device management system 114 may perform an act 408 of determining whether to apply a default power setting. Where the peripheral device management system 114 determines to apply the default power setting, the peripheral device management system 114 may perform an act 410 of charging the client device 102 based on the default power setting. This may include charging the client device 102 at a fast rate, slow rate, medium rate, or any charging rate corresponding to a default power setting for the client device 102.

Alternatively, where the peripheral device management system 114 determines that a setting other than the default power setting should be used when charging the client device 102, the peripheral device management system 114 may perform an act 412 of generating an interface prompt. The interface prompt may include any number of selectable options to enable a user of the client device 102 to select a corresponding power setting to apply when charging the client device 102. This may include selecting a charge rate or indicating that the client device 102 should not be charged to full capacity under current circumstances.

Based on the selected user input, the peripheral device management system 114 may perform an act 414 of determining whether to apply an alternative (e.g., a non-default) power setting when charging the client device 102. Where a user input indicates a preference to apply the default power setting, the peripheral device management system 114 may perform the act 410 of charging the client device based on the default power setting. Alternatively, where the user input indicates a preference to apply an alternative power setting (e.g., a non-default power setting), the peripheral device management system 114 can instead perform the act 416 of charging the client device 102 based on the alternative power setting. This may include implementing a slow charge or a fast charge depending on the user input and/or environmental conditions of the client device 102.

Figure 5A:
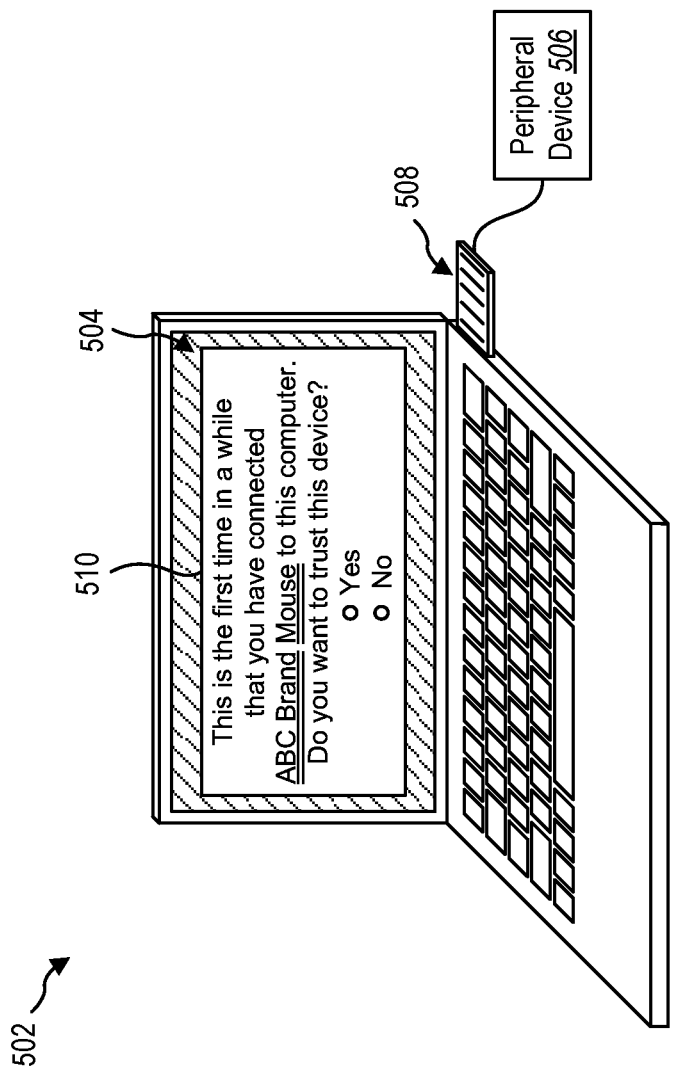
FIG. 5A illustrates an example interface prompt based on a peripheral device and device profile in accordance with one or more embodiments.
Figure 5B:
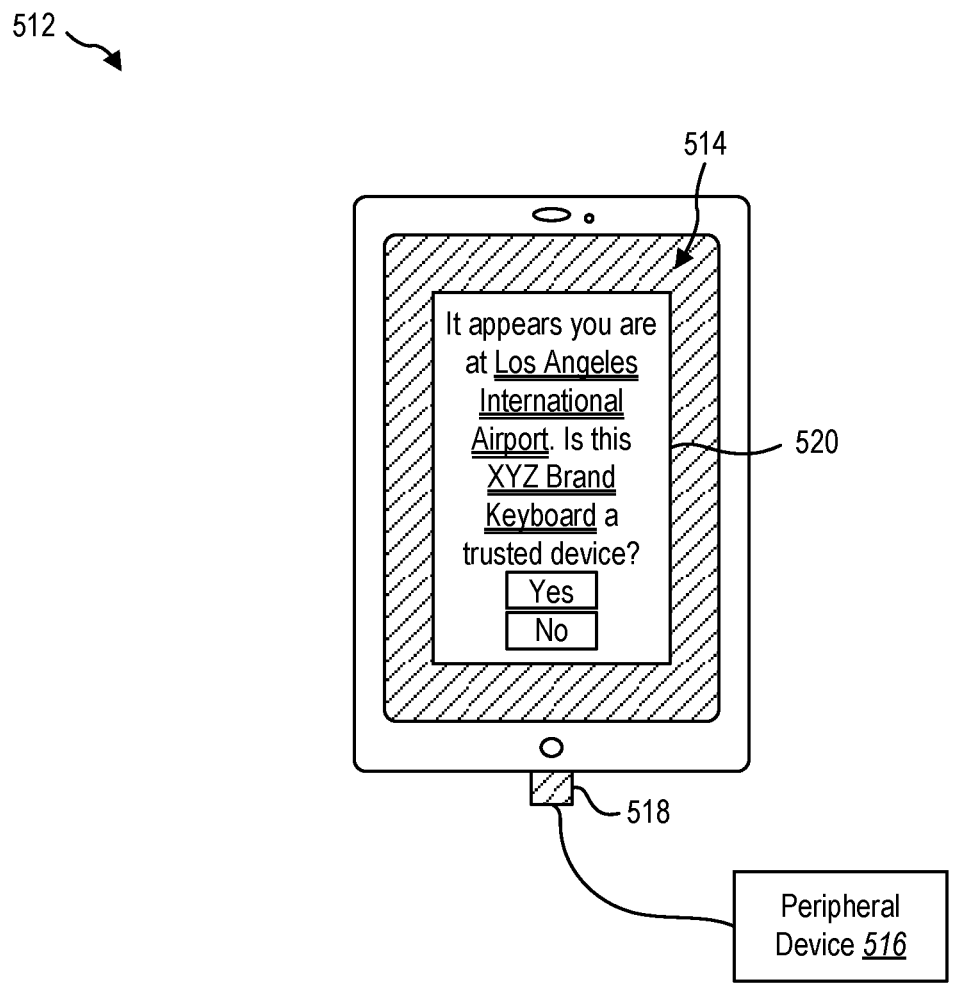
FIG. 5B illustrates another example interface prompt based on a peripheral device and device profile in accordance with one or more embodiments.

FIGS. 5A-5B illustrate example interface prompts in accordance with one or more embodiments discussed above. For example, FIGS. 5A-5B illustrate example interface prompts provided via a graphical user interface of client devices based on a determination that a risk factor exceeds a threshold risk factor. In one or more embodiments, the client device(s) may forego presenting an interface prompt and instead establish a trusted connection with a peripheral device where the risk factor does not exceed a threshold risk factor.

FIG. 5A illustrates an example client device 502 (e.g., a laptop device) including a graphical user interface 504. As shown in FIG. 5A, the client device 502 is connected to a peripheral device 506 via a connector 508 (e.g., USB connector). As further shown, the client device 502 (e.g., a peripheral device management system 114 implemented on the client device 502) may provide an interface prompt 510 based on a determination that a risk factor for the peripheral device 506 exceeds a threshold risk factor.

As shown in FIG. 5A, the interface prompt 510 includes information associated with the peripheral device 506 that enables a user of the client device 502 to make a decision as to whether the client device 502 can trust the peripheral device 506. For instance, the interface prompt 510 reads: "This is the first time in a while that you have connected ABC Brand Mouse to this computer. Do you want to trust this device?" In one or more embodiments, the peripheral device management system 114 provides this information including an indication of the usage history (e.g., that this brand or class of device has not been connected to the client device 502 in a while) in addition to indicators of the peripheral device (e.g., a brand name and device-type).

This information will enable a user of the client device 502 to easily determine whether the peripheral device 506 corresponds to the information contained within the interface prompt 510. For instance, if the peripheral device 506 is not the "ABC Brand Mouse," a user may quickly determine that the peripheral device 506 poses a threat and that there is a significant risk that the peripheral device is a malicious device. Based on this observation, it should be easy for the user to select the "no" option to block further access to the client device 502. Alternatively, where the peripheral device 506 matches the information contained in the interface prompt 510, a user may select the "yes" option and cause the client device 502 to grant a level of trust to the peripheral device 506 by generating an enumeration for the peripheral device 506 and enabling the peripheral device 506 to interact with systems of the client device 502.

FIG. 5B illustrates another example client device 512 (e.g., a smart phone) including a graphical user interface 514. As shown in FIG. 5B, the client device is connected to a peripheral device 516 via a connector 518. As further shown, the client device 512 may provide an interface prompt 520 (e.g., based on a determination that a determined risk factor exceeds a threshold risk factor).

Similar to FIG. 5A, the interface prompt 520 includes information associated with the peripheral device 516 and the client device 512 to provide an indication for a high risk factor. For example, the interface prompt 520 reads: "It appears you are at Los Angeles International Airport. Is this XYZ Brand Keyboard a trusted device?" The user of the client device 512 may then select the "yes" option indicating that the peripheral device 516 is a trusted device. Alternatively, the user of the client device 512 may select the "no" option indicating that the peripheral device 516 is not trusted.

These example graphical user interfaces are provided by way of example and are not intended to be limiting. For example, the interface prompts may include any information associated with factors that contribute to a particular risk factor. In addition, the interface prompts may include additional selectable options other than "yes" or "no." For example, in one or more embodiments, an interface prompt includes a wider variety of selectable options that enable a user to selectively provide access to one or more interfaces of the interface system 106. For example, based on user selections, the client device 102 may provide selective access to a power interface 108 while blocking access to a data interface 110 or a command interface 112 (e.g., a PCI interface).

Figure 6:
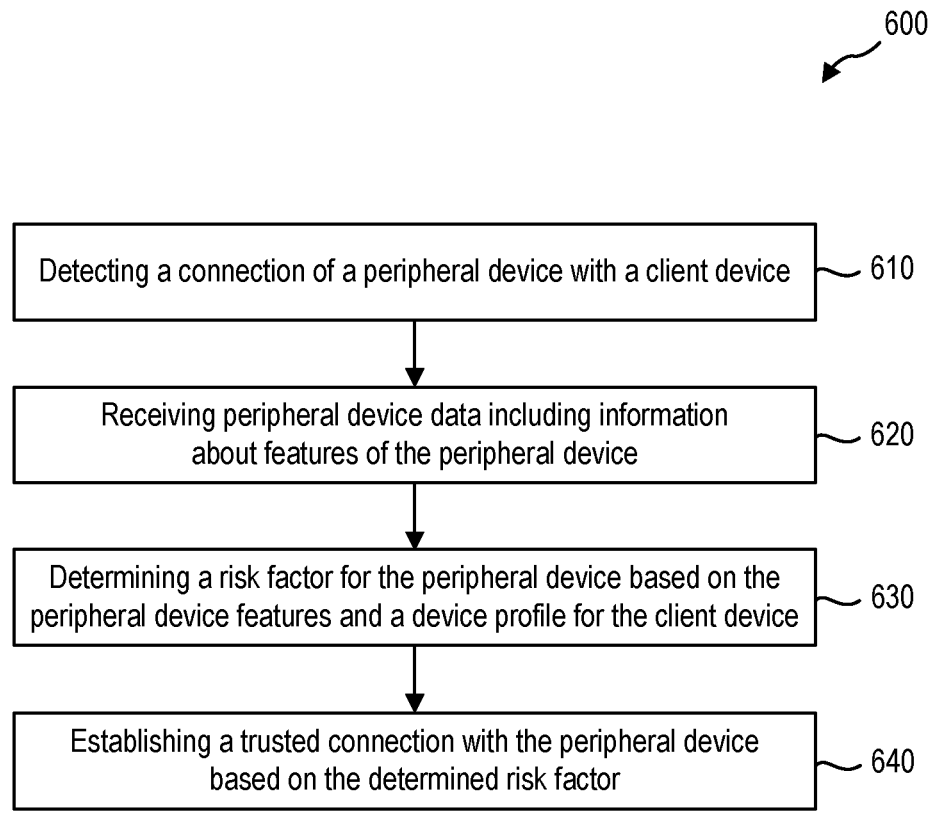
FIG. 6 illustrates an example series of acts for managing a connection between a peripheral device and a client device in accordance with one or more embodiments.

Turning now to FIG. 6, this figure illustrates example flowcharts including series of acts for determining whether to establish a trusted relationship with a peripheral device. While FIG. 6 illustrates acts according to one or more embodiments, alternative embodiments may omit, add to, reorder, and/or modify any of the acts shown in FIG. 6. Moreover, one or more of the individual features and functionalities described in connection with individual acts or series of acts in connection with FIG. 6 may similarly apply to other embodiments and examples described herein. The acts of FIG. 6 can be performed as part of a method. Alternatively, a non-transitory computer-readable medium can include instructions that, when executed by one or more processors, cause a computing device to perform the acts of FIG. 6. In still further embodiments, a system can perform the acts of FIG. 6.

As shown in FIG. 6, the series of acts 600 incudes an act 610 of detecting a connection of a peripheral device with a client device. For example, the act 610 may include detecting a connection of a peripheral device with an externally accessible port of a client device. In one or more embodiments, the externally accessible port includes a universal serial bus (USB) port including an interface configured to receive power signals and data signals via different bus drivers of the client device.

As further shown, the series of acts 600 includes an act 620 of receiving peripheral device data including information about features of the peripheral device. For example, the act 620 may include receiving, from the peripheral device via the detected connection, peripheral device data including one or more indicators associated with features of the peripheral device.

The series of acts 600 may also include an act 630 of determining a risk factor for the peripheral device based on the peripheral device features and a device profile for the client device. For example, the act 630 may include determining a risk factor for the peripheral device based on the one or more indicators received from the peripheral device and a device profile including environmental information for the client device and historical usage information for the client device.

The environmental information may include a variety of information. For example, the environmental information may include a current location of the client device at a time that the connection of the peripheral device is detected. The environmental information may also include an indication of a presence or absence of one or more known wireless devices within a proximity of the client device at the time that the connection of the peripheral device is detected. The environmental information may also include an identification of one or more peripheral devices already connected to the client device at the time that the connection of the peripheral device is detected.

The historical usage information may also include a variety of information. For example, the historical usage information may include an indication that the peripheral device has not previously been connected to the client device. The historical usage information may also include an indication that the peripheral device has connected to one or more similar peripheral devices as the peripheral device. The historical usage information may also include a historical pattern of previously detected connections between the client device and one or more peripheral devices. The historical usage information may also include an indication of one or more locations of the client device when the client device has connected to one or more peripheral devices.

In one or more embodiments, receiving the peripheral device data includes receiving an indication of a device-type for the peripheral device. In addition, determining the risk factor may include identifying one or more input capabilities for the device type corresponding to the received indication and determining the risk factor based on the identified one or more input capabilities for the device type.

The series of acts 600 may further include an act 640 of establishing a trusted connection with the peripheral device based on the determined risk factor. For example, the act 640 may include granting a level of trust to the peripheral device based on the determined risk factor. In one or more embodiments, the series of acts 600 further includes determining that the risk factor is less than a threshold risk factor associated with a threshold risk that the peripheral device is a malicious device. In one or more implementations, granting the level of trust to the peripheral device includes enumerating the peripheral device on the client device based on determining that the risk factor is less than the threshold risk factor.

In one or more embodiments, the series of acts 600 includes determining that the risk factor is greater than a threshold risk factor associated with a threshold risk that the peripheral device is a malicious device. In addition, the series of acts 600 may include, in response to determining that the risk factor is greater than the threshold risk factor, providing an interface prompt via a graphical user interface of the client device indicating a risk associated with establishing a trusted connection with the peripheral device where the interface prompt includes one or more selectable options associated with granting the level of trust to the peripheral device.

The series of acts 600 may include detecting a user selection of a selectable option from the one or more selectable options provided within the interface prompt indicating a preference to establish a trusted relationship with the peripheral device. Granting the level of trust to the peripheral device may include enumerating the peripheral device on the client device based on detecting the user selection of the selectable option provided within the interface prompt.

Alternatively, the series of acts 600 may include detecting a user selection of a selectable option from the one or more selectable options provided within the interface prompt indicating a preference to prevent a trusted relationship with the peripheral device. Granting the level of trust to the peripheral device may include disabling further communication from the peripheral device to the client device based on detecting the user selection of the selectable option provided within the interface prompt.

In one or more embodiments, the peripheral device is a device that is capable of charging the client device (e.g., via the connection between the client device and peripheral device). The series of acts 600 may include identifying a plurality of charging preferences associated with a speed of charging the client device via the connection with the peripheral device. The series of acts 600 may further include, based on environmental information from the device profile, selecting a charging preference from the plurality of charging preferences. The plurality of charging preference may include first charging speed preference associated with a first charging speed and a second charging speed preference associated with a second charging speed that is faster than the first charging speed. In addition, the charging preference may be selected based on a combination of a time that that the connection of the peripheral device is detected and a location of the client device at the time that the connection of the peripheral device is detected.

Figure 7:
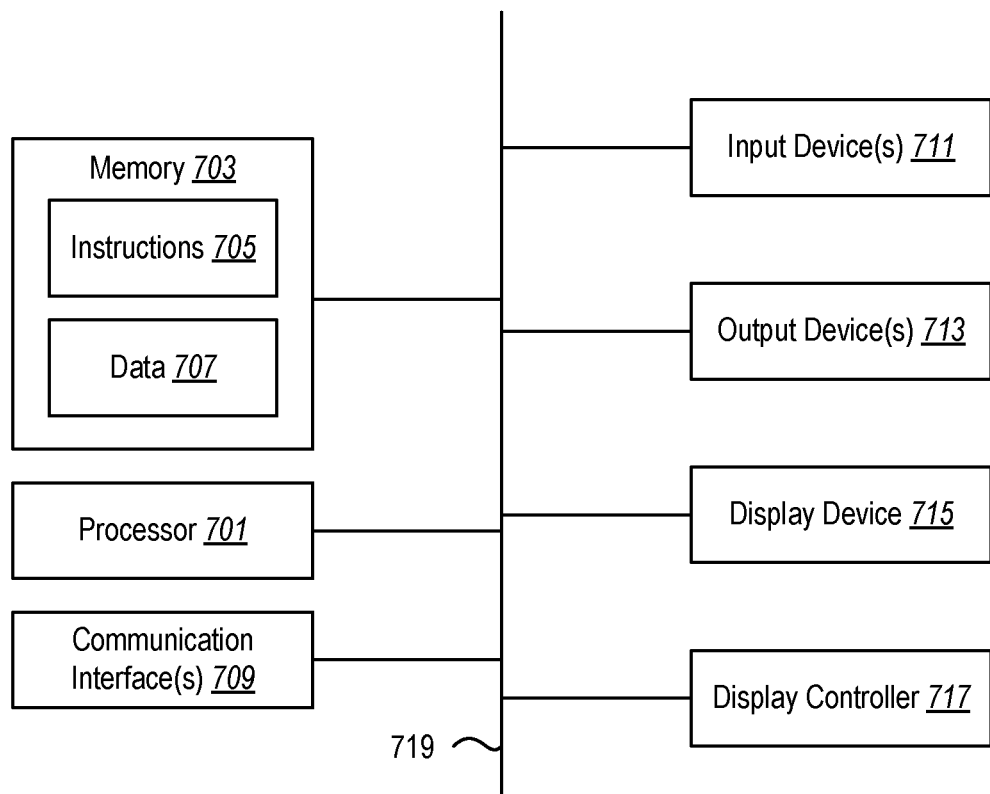
FIG. 7 illustrates certain components that may be included within a computer system.

FIG. 7 illustrates certain components that may be included within a computer system 700. One or more computer systems 700 may be used to implement the various devices, components, and systems described herein.

The computer system 700 includes a processor 701. The processor 701 may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 701 may be referred to as a central processing unit (CPU). Although just a single processor 701 is shown in the computer system 700 of FIG. 7, in an alternative configuration, a combination of processors (e.g., an ARM and DSP) could be used.

The computer system 700 also includes memory 703 in electronic communication with the processor 701. The memory 703 may be any electronic component capable of storing electronic information. For example, the memory 703 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 705 and data 707 may be stored in the memory 703. The instructions 705 may be executable by the processor 701 to implement some or all of the functionality disclosed herein. Executing the instructions 705 may involve the use of the data 707 that is stored in the memory 703. Any of the various examples of modules and components described herein may be implemented, partially or wholly, as instructions 705 stored in memory 703 and executed by the processor 701. Any of the various examples of data described herein may be among the data 707 that is stored in memory 703 and used during execution of the instructions 705 by the processor 701.

A computer system 700 may also include one or more communication interfaces 709 for communicating with other electronic devices. The communication interface(s) 709 may be based on wired communication technology, wireless communication technology, or both. Some examples of communication interfaces 709 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 700 may also include one or more input devices 711 and one or more output devices 713. Some examples of input devices 711 include a keyboard, mouse, microphone, remote control device, button, joystick, trackball, touchpad, and lightpen. Some examples of output devices 713 include a speaker and a printer. One specific type of output device that is typically included in a computer system 700 is a display device 715. Display devices 715 used with embodiments disclosed herein may utilize any suitable image projection technology, such as liquid crystal display (LCD), light-emitting diode (LED), gas plasma, electroluminescence, or the like. A display controller 717 may also be provided, for converting data 707 stored in the memory 703 into text, graphics, and/or moving images (as appropriate) shown on the display device 715.

The various components of the computer system 700 may be coupled together by one or more buses, which may include a power bus, a control signal bus, a status signal bus, a data bus, etc. For the sake of clarity, the various buses are illustrated in FIG. 7 as a bus system 719.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
   detecting a connection of a peripheral device with an externally accessible port of a client device;
   receiving, from the peripheral device via the detected connection, peripheral device data including one or more indicators associated with features of the peripheral device;
   determining a connection pattern of the client device connecting to peripheral devices based on historical usage information from a client device profile, wherein the historical usage information comprises previous connections of the peripheral devices to the client device, previous connection times, and previous geographical connection locations;
   identifying current environmental information of the client device comprising a time that the connection of the peripheral device is initially detected and a geographical location of the client device at the time the connection of the peripheral device is initially detected;
   determining a risk factor for the peripheral device based on:
      comparing the one or more indicators received from the peripheral device to the determined connection pattern of the client device; and comparing the current environmental information of the client device to the determined connection pattern of the client device based, at least in part, on the time or the geographical location of the client device at the time that the connection of the peripheral device is initially detected; and granting a level of trust to the peripheral device based on the determined risk factor.

2. The method of claim 1, wherein the externally accessible port comprises a universal serial bus (USB) port including an interface configured to receive power signals and data signals via different bus drivers of the client device.

3. The method of claim 1, wherein:
receiving the peripheral device data comprises receiving an indication of a device type for the peripheral device; and
determining the risk factor comprises:
identifying one or more input capabilities for the device type for the peripheral device corresponding to the received indication; and
determining the risk factor based on the identified one or more input capabilities for the device type.

4. The method of claim 1, wherein determining the risk factor includes:
comparing the one or more indicators received from the peripheral device to the historical usage information;
comparing the time that the connection of the peripheral device is initially detected to previous connection times of the historical usage information; and
comparing the geographical location of the client device at the time the connection of the peripheral device is initially detected to previous geographical connection locations of the historical usage information.

5. The method of claim 1, wherein the environmental information additionally includes one or more of:
an indication of a presence or absence of one or more known wireless devices within a proximity of the client device at the time that the connection of the peripheral device is initially detected; and
an identification of one or more peripheral devices already connected to the client device at the time that the connection of the peripheral device is initially detected.

6. The method of claim 1, wherein the historical usage information includes one or more of:
an indication that the peripheral device has connected to one or more peripheral devices having respective indicators that match the one or more indicators associated with features of the peripheral device;
a historical pattern of previously detected connections between the client device and the one or more peripheral devices identified from the previous connection times and the previous geographical connection locations; or
an indication of one or more geographical locations of the client device when the client device has connected to the one or more peripheral devices.

7. The method of claim 1, further comprising:
determining that the risk factor is less than a threshold risk factor associated with a threshold risk that the peripheral device is a malicious device, and
wherein granting the level of trust to the peripheral device comprises enumerating the peripheral device on the client device based on determining that the risk factor is less than the threshold risk factor.

8. The method of claim 1, further comprising:
determining that the risk factor is greater than a threshold risk factor associated with a threshold risk that the peripheral device is a malicious device; and
in response to determining that the risk factor is greater than the threshold risk factor, providing an interface prompt via a graphical user interface of the client device indicating a risk associated with establishing a trusted connection with the peripheral device, wherein the interface prompt includes one or more selectable options associated with granting the level of trust to the peripheral device.

9. The method of claim 8, further comprising:
detecting a user selection of a selectable option from the one or more selectable options provided within the interface prompt indicating a preference to establish a trusted relationship with the peripheral device, and
wherein granting the level of trust to the peripheral device comprises enumerating the peripheral device on the client device based on detecting the user selection of the selectable option provided within the interface prompt.

10. The method of claim 8, further comprising:
detecting a user selection of a selectable option from the one or more selectable options provided within the interface prompt indicating a preference to prevent a trusted relationship with the peripheral device, and
wherein granting the level of trust to the peripheral device comprises disabling further communication from the peripheral device to the client device based on detecting the user selection of the selectable option provided within the interface prompt.

11. The method of claim 1, wherein the peripheral device is capable of charging the client device, further comprising:
identifying a plurality of charging preferences associated with a speed of charging the client device via the connection with the peripheral device; and
based on environmental information from the device profile, selecting a charging preference from the plurality of charging preferences.

12. The method of claim 11, wherein the plurality of charging preferences include a first charging speed preference associated with a first charging speed and a second charging speed preference associated with a second charging speed that is faster than the first charging speed, and wherein the charging preference is selected based on a combination of a time that that the connection of the peripheral device is detected and a geographical location of the client device at the time that the connection of the peripheral device is initially detected.

13. A system, comprising:
one or more processors;
memory in electronic communication with the one or more processors; and
instructions stored in the memory, the instructions being executable by the one or more processors to:
detect a connection of a peripheral device with an externally accessible port of a client device;
receive, from the peripheral device via the detected connection, peripheral device data including one or more indicators associated with features of the peripheral device;
determine a connection pattern of the client device connecting to peripheral devices based on historical usage information from a client device profile, wherein the historical usage information comprises previous connections of the peripheral devices to the client device, previous connection times, and previous geographical connection locations;
identify current environmental information of the client device comprising a time that the connection of the peripheral device is initially detected and a geographical location of the client device at the time the connection of the peripheral device is initially detected;
determine a risk factor for the peripheral device based on:
comparing the one or more indicators received from the peripheral device to the determined connection pattern of the client device; and
comparing the current environmental information of the client device to the determined connection pattern of the client device based, at least in part, on the time or the geographical location of the client device at the time that the connection of the peripheral device is initially detected; and
grant a level of trust to the peripheral device based on the determined risk factor.

14. The system of claim 13,
wherein receiving the peripheral device data comprises receiving an indication of a device-type for the peripheral device, and
wherein determining the risk factor includes:
identifying one or more input capabilities for the device type corresponding to the received indication; and
determining the risk factor based on the identified one or more input capabilities for the device type.

15. The system of claim 13, further comprising instructions being executable by the one or more processors to:
determine that the risk factor is greater than a threshold risk factor associated with a threshold risk that the peripheral device is a malicious device;
in response to determining that the risk factor is greater than the threshold risk factor, provide an interface prompt via a graphical user interface of the client device indicating a risk associated with establishing a trusted connection with the peripheral device, wherein the interface prompt includes one or more selectable options associated with granting the level of trust to the peripheral device; and
detect a user selection of a selectable option from the one or more selectable options provided within the interface prompt indicating a preference to establish a trusted relationship with the peripheral device,
wherein granting the level of trust to the peripheral device comprises enumerating the peripheral device on the client device based on detecting the user selection of the selectable option provided within the interface prompt.

16. The system of claim 13, further comprising instructions being executable by the one or more processors to:
determine that the risk factor is greater than a threshold risk factor associated with a threshold risk that the peripheral device is a malicious device;
in response to determining that the risk factor is greater than the threshold risk factor, provide an interface prompt via a graphical user interface of the client device indicating a risk associated with establishing a trusted connection with the peripheral device, wherein the interface prompt includes one or more selectable options associated with granting the level of trust to the peripheral device; and
detect a user selection of a selectable option from the one or more selectable options provided within the interface prompt indicating a preference to prevent a trusted relationship with the peripheral device,
wherein granting the level of trust to the peripheral device comprises disabling further communication from the peripheral device to the client device based on detecting the user selection of the selectable option provided within the interface prompt.

17. A non-transitory computer-readable medium storing instructions thereon that, when executed by one or more processors, causes a client device to:
detect a connection of a peripheral device with an externally accessible port of the client device;
receive, from the peripheral device via the detected connection, peripheral device data including one or more indicators associated with features of the peripheral device;
determine a connection pattern of the client device connecting to peripheral devices based on historical usage information from a client device profile, wherein the historical usage information comprises previous connections of the peripheral devices to the client device, previous connection times, and previous geographical connection locations;
identify current environmental information of the client device comprising a time that the connection of the peripheral device is initially detected and a geographical location of the client device at the time the connection of the peripheral device is initially detected;
determine a risk factor for the peripheral device based on:
comparing the one or more indicators received from the peripheral device to the determined connection pattern of the client device; and
comparing the current environmental information of the client device to the determined connection pattern of the client device based, at least in part, on the time or the geographical location of the client device at the time that the connection of the peripheral device is initially detected; and
grant a level of trust to the peripheral device based on the determined risk factor associated with previous connections of one or more peripheral devices to the client device.

18. The non-transitory computer-readable medium of claim 17,
wherein receiving the peripheral device data comprises receiving an indication of a device type for the peripheral device, and
wherein determining the risk factor includes:
identifying one or more input capabilities for the device type corresponding to the received indication; and
determining the risk factor based on the identified one or more input capabilities for the device type.

19. The non-transitory computer-readable medium of claim 17, further comprising instructions that, when executed by the one or more processors, causes the client device to:
determine that the risk factor is greater than a threshold risk factor associated with a threshold risk that the peripheral device is a malicious device;
in response to determining that the risk factor is greater than the threshold risk factor, provide an interface prompt via a graphical user interface of the client device indicating a risk associated with establishing a trusted connection with the peripheral device, wherein the interface prompt includes a plurality of selectable options associated with granting different levels of trust to the peripheral device; and in response to detecting a user selection of a first selectable option or a second selectable option from the plurality of selectable options:
- enumerating the peripheral device on the client device based on a selection of the first selectable option from the plurality of selectable options; or
- disabling further communication from the peripheral device to the client device based on a selection of the second selectable option from the plurality of selectable options.

20. The non-transitory computer-readable medium of claim 17, wherein the peripheral device is capable of charging the client device, and further comprising instructions that, when executed by the one or more processors, causes the client device to:
- identify a plurality of charging preferences associated with a speed of charging the client device via the connection with the peripheral device; and
- based on environmental information from the device profile, select a charging preference from the plurality of charging preferences,
- wherein the plurality of charging preferences includes a first charging speed preference associated with a first charging speed and a second charging speed preference associated with a second charging speed that is faster than the first charging speed, and
- wherein the charging preference is selected based on a combination of a time that that the connection of the peripheral device is detected and a geographical location of the client device at the time that the connection of the peripheral device is initially detected.

\* \* \* \* \*